United States Patent [19]
Majumdar

[11] 3,859,106
[45] Jan. 7, 1975

[54] AUTOCLAVED MATERIALS

[75] Inventor: Amalendu Jyoti Majumdar, St. Albans, England

[73] Assignee: National Research Development Corporation, London, England

[22] Filed: July 26, 1972

[21] Appl. No.: 275,420

Related U.S. Application Data

[63] Continuation-in-part of Ser. No. 127,361, March 23, 1971, Pat. No. 3,783,092, which is a continuation of Ser. No. 31,184, March 26, 1970, abandoned.

[30] Foreign Application Priority Data
Aug. 5, 1971 Great Britain ................. 36855/71

[52] U.S. Cl. .................................. 106/120, 106/57
[51] Int. Cl. .............................................. C04b 7/34
[58] Field of Search ............................ 106/120, 57

[56] References Cited
UNITED STATES PATENTS

| | | | |
|---|---|---|---|
| 3,226,243 | 12/1965 | Levin .................................. | 106/120 |
| 3,238,052 | 3/1966 | Burak et al. ....................... | 106/120 |
| 3,311,481 | 3/1967 | Sterry et al. ....................... | 106/57 |
| 3,704,147 | 11/1972 | Hardy et al. ....................... | 106/57 |
| 3,709,706 | 1/1973 | Sowman .............................. | 106/57 |
| 3,736,160 | 5/1973 | Hamling .............................. | 106/57 |
| 3,736,162 | 5/1973 | Chyalovsky et al. ............... | 106/99 |
| 3,793,041 | 2/1974 | Sowman .............................. | 106/57 |

FOREIGN PATENTS OR APPLICATIONS

| | | | |
|---|---|---|---|
| 249,577 | 12/1969 | U.S.S.R. ............................. | 106/57 |

OTHER PUBLICATIONS

Budnikov et al., "Increasing the Strength of Glass Fiber in a Medium of Hardening Cement Block," Kiev Polytechnic Institute, 1965.

Uriev et al., "Some Characteristics of the Breakdown Mechanism of Glass Fibers Under Crystallization Conditions," Doklady Akademii Nauk SSSR, Vol. 177, No. 6, pp. 1404–1406, 1967.

*Primary Examiner*—Delbert E. Gantz
*Assistant Examiner*—James W. Hellwege
*Attorney, Agent, or Firm*—Flynn & Frishauf

[57] ABSTRACT

An autoclaved calcium silicate product comprises reinforcing fibres of an alkali-resistant glass containing zirconia.

5 Claims, No Drawings

AUTOCLAVED MATERIALS

This application is a continuation-in-part of Application Serial No. 127,361 filed Mar. 23, 1971 now U.S. Pat. No. 3,783,092, which in turn was a continuation of application Ser. No. 31,184, filed Mar. 26, 1970, now abandoned.

This invention relates to glass fibre-reinforced cementitious products and is an improvement or modification of the inventions described in U.K. Pat. Nos. 1,200,732 and 1,243,972.

Recent developments in the field of glass reinforced cement composites have resulted in the establishment of criteria for the compatibility of glass fibres with cementitious materials such as Portland cement and other types of cement in which the setting and hardening of the material depend on a reaction between calcareous and siliceous materials. These criteria including alkali-resistance have been described in our U.K. Pat. Nos. 1,200,732 and 1,243,972.

It has been found among the alkali resistant glasses that those containing zirconia are particularly outstanding for use with cementitious matrices. Thus with Portland cement cured under practically normal conditions, e.g., at ambient temperature, fibres of the zirconia glasses give composites with excellent properties. However, where extraordinary curing conditions are employed, including the use of high temperatures, even these fibres are not fully able to withstand the severely alkaline corrosive conditions prevailing in the matrix and therefore the substitution of glass fibres for asbestos in such situations has not hitherto been regarded as possible. The continuing problems arising from the practical use of asbestos, however, have caused us to revert to the search for a substitute and, contrary to previous assumptions and expectation, it has now been found that the zirconia glass fibres are in fact highly successful as reinforcing elements in autoclaved calcium silicate materials.

Autoclaved clacium silicate materials are used extensively in the building industry in the form of sand-lime bricks, asbestos reinforced sheets, pipes and various other products. Products which are autoclaved clacium silicate reinforced with different types of asbestos fibre are widely used for their thermal insulating and fire-resisting properties. In general these materials are made by subjecting mixtures of lime and silica with optional additions of other binders, such as Portland cement to high pressure steam in an autoclave. The asbestos fibres can be introduced into the matrix before autoclaving. The proportions of lime to silica and the type of starting materails are chosen so as to give the desired properties to the finished product in terms of strength, density and thermal conductivity e.g. as specified in British Standard B.S. 3536:1962. In general the lime to silica molar ratio is in the range 0.8 – 1.2 and the materials are autoclaved at 150° – 200°C for 5 to 10 hours.

Without a suitable fibrous reinforcement these materials do not have adequate mechanical strength. Asbestos fibres have been used up to the present time to provide this reinforcement because of their cheapness, high strength, and compatibility with the matrix at elevated temperatures and pressures. Recently some concern has been expressed concerning the possible health hazards associated with the use of materials containing such fibres. particular difficulties are thought to arise when they are used in the construction of walls, doors, ceilings and other components. Operations such as cutting, sawing, drilling and finishing of these sheets in a confined space are considered to be particularly dangerous. Attempts are therefore being made to find a replacement for asbestos fibres for use in these applications.

Alkali resistant zirconia bearing glass fibres show outstanding promise as substitutes for asbestos in the above mentioned cementitious products. Excellent results are obtained with fibres of glasses containing at least 6.0 mol percent $ZrO_2$ including glasses based on the system $SiO_2/ZrO_2/Na_2O$, for example those described in U.K. Pat. 1,243,972 and U.K. Pat. No. 37862/69. Reinforced sheets containing these materials are prepared by spraying mixtures of hydrated lime and a suitable siliceous material (sand or diatomaceous earth) and chopped glass fibres on to a vacuum mould in accordance with the technique described in U.K. Pat. No. 1,200,732. The slurry of lime and silica may be prepared several hours before spraying and heated if necessary to effect a preliminary reaction. Immediately before fabricating the board, a quantity of cement and/or other binders may be advantageously added. The amount of glass fibre incorporated in the board depends on the end use of the product but for materials conforming to British Standard B.S. 3536:1962 an addition of 2 – 10 percent of fibre on the weight of wet boards is appropriate (5– 20 percent glass in finished board). Boards of glass fibre reinforced autoclaved calcium silicate material have been made using lime and various sources of silica with a zirconia-bearing alkali-resistant glass fibre. Results on boards having a nominal lime to silica molar ratio of 1.0 made at temperatures between 150°C and 180°C with curing times ranging from 3 to 8 hours are very promising. Some typical examples of materials, operating conditions, and resulting properties are given in the following Table.

Bending strength is given in Meganewtons per square metre ($MN/m^2$). Impact strength is given in Kilo joules per square metre ($KJ/m^2$). Density units are Kilograms per cubic metre ($Kg/m^3$).

| COMPOSITION | 1 | 2 | 3 | 4 | 5 | 6 | 7 | 8 | 9 | 10 | 11 | 12 |
|---|---|---|---|---|---|---|---|---|---|---|---|---|
| wt. $Ca(OH)_2$ Kg. | 19.6 | 18.7 | 18.7 | 18.7 | 19.9 | 19.5 | 23.9 | 24.3 | 21.3 | 18.7 | 18.7 | 22.6 |
| wt. quartz Kg. | 7.6 | — | — | — | — | — | — | — | 6.8 | — | — | 9.04 |
| wt. kieselguhr Kg. | 8.8 | 17.3 | 17.3 | 17.3 | 20.1 | 22.8 | 16.1 | 18.04 | 7.8 | 17.3 | 17.3 | 10.4 |
| wt. cement Kg. | 4 | 4 | 4 | 4 | — | 4 | — | 4 | 4 | 4 | 4 | — |
| lime/silica ratio | 1.0 | 1.0 | 1.0 | 1.0 | 0.8 | 0.8 | 1.2 | 1.2 | 1.2 | 1.0 | 1.0 | 0.8 |
| glass content % wt. | 5.5 | 6.2 | 6.4 | 7.3 | 5.8 | 6.4 | 6.4 | 5.9 | 5.5 | 10.7 | 2.1 | 5.7 |
| AUTOCLAVE REGIME: | | | | | | | | | | | | |
| Temp. °C | 150 | 180 | 161 | 180 | 150 | 180 | 150 | 161 | 180 | 180 | 180 | 180 |
| Time hrs. | 5 | 3 | 2 | 3 | 5 | 20 | 5 | 3 | 8 | 10 | 10 | 8 |
| PHYSICAL PROPERTIES: | | | | | | | | | | | | |
| Bending strength | 8.36 | 5.03 | 6.08 | 7.10 | 5.65 | 6.97 | 5.10 | 5.27 | 7.07 | 10.45 | 1.54 | 8.44 |
| Impact strength | 7.53 | 5.25 | 7.53 | 5.78 | 8.41 | 7.36 | 8.06 | 4.90 | 6.30 | 16.11 | 3.33 | 6.65 |
| Density | 857 | 625 | 609 | 657 | 577 | 593 | 641 | 641 | 817 | 641 | 577 | 721 |
| Screw pulling strength Kg. | 22 | — | 43 | — | 13 | 16 | 11 | 15 | 16 | 17 | 9 | 22 |
| Thickness (mm) | 8.5 | 7.4 | 15.0 | 8.3 | 7.5 | 7.7 | 7.2 | 7.6 | 8.8 | 7.4 | 7.3 | 7.8 |

The invention is applicable to the production of boards in the category of "Insulation Board" and also to the similar products of higher density usually at least 55 lbs. per cu.ft. which are referred to as Wallboards (B.S. 3536:1962). The impact resistance of the new products is far superior to that of conventional products and their fire resistance is extremely good.

I claim:

1. An autoclaved calcium silicate material reinforced with fibres on an alkali-resistant $SiO_2/ZrO_2$/alkali metal oxide glass containing at least 6.0 mol percent $ZrO_2$.

2. A material according to claim 1 in which the glass contains at least 65 percent $SiO_2$ and at least 10 percent $ZrO_2$ by weight.

3. A material according to claim 1 containing from 5 to 20% by weight of glass fibre.

4. A calcium silicate wallboard or insulation board reinforced with fibres of an alkali-resistant $SiO_2/ZrO_2$/alkali metal oxide glass containing at least 6.0 mol percent $ZrO_2$.

5. A process for the production of a fibre reinforced calcium silicate material which comprises incorporating in a wet mixture of hydrated lime and a siliceous material fibres of an alkali-resistant $SiO_2/ZrO_2$/alkali metal oxide glass containing at least 6.0 mol % $ZrO_2$, subjecting said mixture to high pressure steam in an autoclave to remove excess moisture and fabricating the mixture into the desired shape, the proportion of fibre being from 2 to 10 percent by weight based on the product immediately prior to curing, and curing the product at elevated temperature and pressure.

* * * * *